(12) United States Patent
Nagare et al.

(10) Patent No.: US 8,313,606 B2
(45) Date of Patent: Nov. 20, 2012

(54) METHOD AND APPARATUS FOR MANUFACTURING WOUND ELECTRODE ASSEMBLY FOR BATTERY

(75) Inventors: Tatsuya Nagare, Hyogo (JP);
Masatomo Mishima, Tokushima (JP);
Souichirou Ueno, Tokushima (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 228 days.

(21) Appl. No.: 12/710,408

(22) Filed: Feb. 23, 2010

(65) Prior Publication Data
US 2010/0212817 A1 Aug. 26, 2010

(30) Foreign Application Priority Data
Feb. 23, 2009 (JP) .................. 2009-039390

(51) Int. Cl.
B32B 37/00 (2006.01)
B32B 38/04 (2006.01)
B29C 65/72 (2006.01)

(52) U.S. Cl. ........ 156/270; 156/290; 156/264; 156/265; 156/192; 156/443; 156/88

(58) Field of Classification Search .......... 156/290, 156/443, 505, 506, 264, 270, 265, 521, 192, 156/88
See application file for complete search history.

(56) References Cited

U.S. PATENT DOCUMENTS 3,772,120 A * 11/1973 Radzins .......... 156/264
4,398,983 A * 8/1983 Suzuki et al. .......... 156/185
6,391,488 B1 5/2002 Shimizu et al.

FOREIGN PATENT DOCUMENTS

| JP | 01-098549 A | 4/1989 |
|----|-------------|--------|
| JP | 02-038251 A | 2/1990 |
| JP | 04-243756 A | 8/1992 |
| JP | 06-140071 A | 5/1994 |
| JP | 09-219189 A | 8/1997 |
| JP | 10-241737 A | 9/1998 |
| JP | 2000-188115 A | 7/2000 |
| JP | 2001-085066 A | 3/2001 |

(Continued)

OTHER PUBLICATIONS

Japanese Office Action dated Feb. 14, 2012, issued in corresponding Japanese Patent Application No. 2009-039390. Information statement issued by JPO dated Aug. 24, 2012 in regards to Japanese Patent Application No. 2009-039390 (3 pages).

*Primary Examiner* — Linda L Gray
(74) *Attorney, Agent, or Firm* — Westerman, Hattori, Daniels & Adrian, LLP

(57) ABSTRACT

The present invention aims to provide a method for bonding protective tapes to the cut edges of an electrode plate within a short period to prevent short circuit in an electrode assembly. An electrode plate cutting & tape bonding process includes (1) cutting an electrode plate into pieces 100*a* and 100*b*, (2) forming a gap W between edges 106 and 107 of the pieces 100*a* and 100*b*, (3) bonding protective tapes 51 and 52 to both sides of the pieces 100*a* and 100*b*, covering the edges and the gap, and (4) conveying the pieces 100*a* and 100*b* connected together. Next, the tapes 51 and 52 are cut into pieces 51*a* & 52*a* and 51*b* & 52*b*. Then, the electrode plate piece 100*a* with the tape pieces 51*a* & 52*a* and 51*b* & 52*b* is wound together with a negative electrode plate, with a separator sandwiched therebetween.

4 Claims, 8 Drawing Sheets

Protective tape cutting

FOREIGN PATENT DOCUMENTS

| | | |
|---|---|---|
| JP | 2001-185096 A | 7/2001 |
| JP | 2001-283836 A | 10/2001 |
| JP | 2002-025604 A | 1/2002 |
| JP | 2002-175832 A | 6/2002 |
| JP | 2008-204920 A | 9/2008 |
| JP | 02009245683 | * 10/2009 |

* cited by examiner

FIG. 3A  Electrode plate cutting
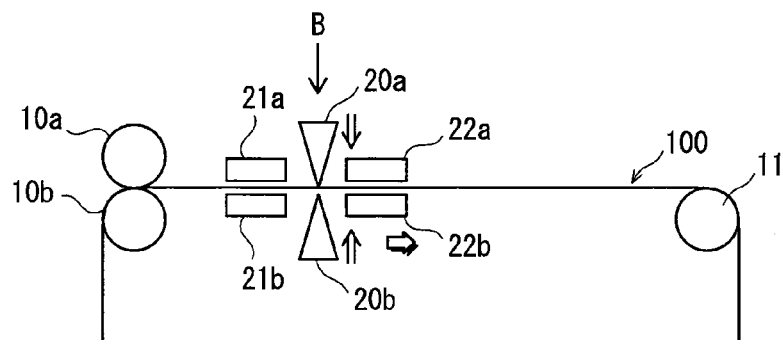
FIG. 3B  Pitch widening
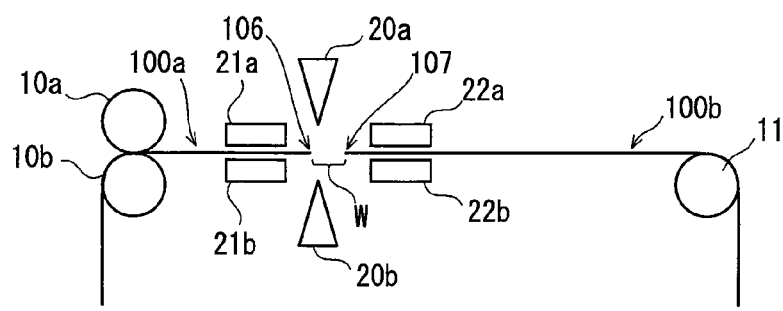
FIG. 3C  Tape bonding
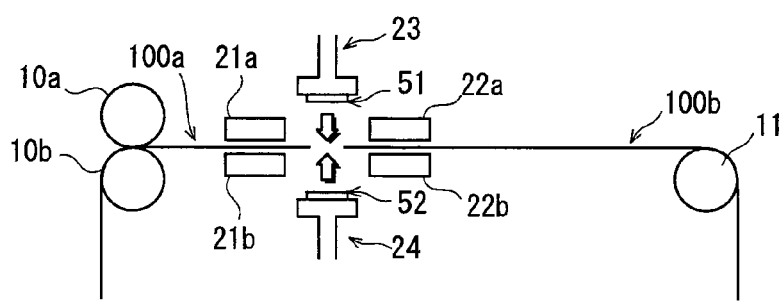
FIG. 3D  Electrode plate conveying
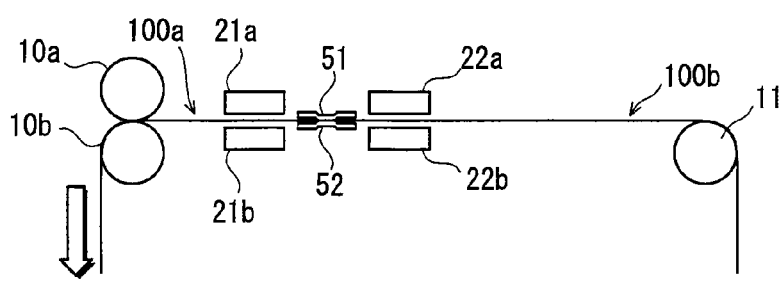

FIG. 6A  Protective tape cutting
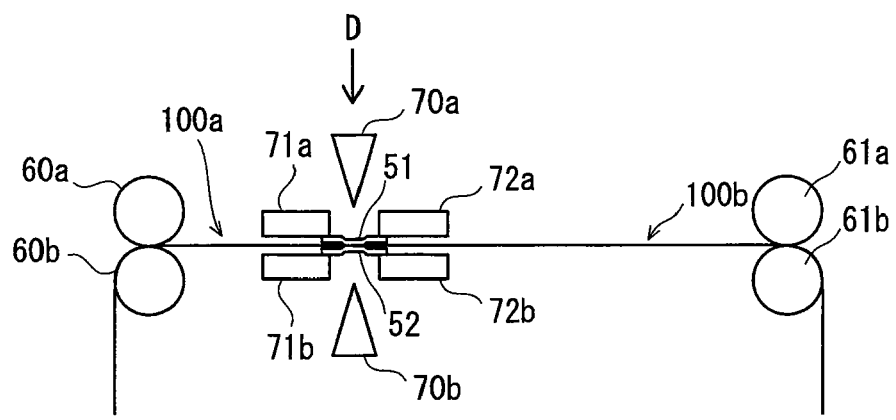
FIG. 6B  Electrode plate conveying
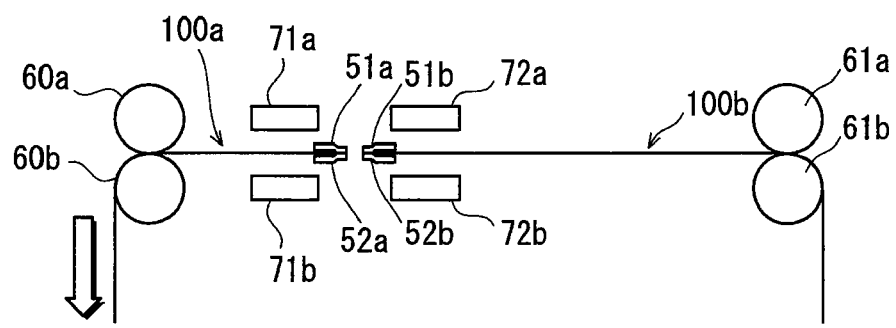

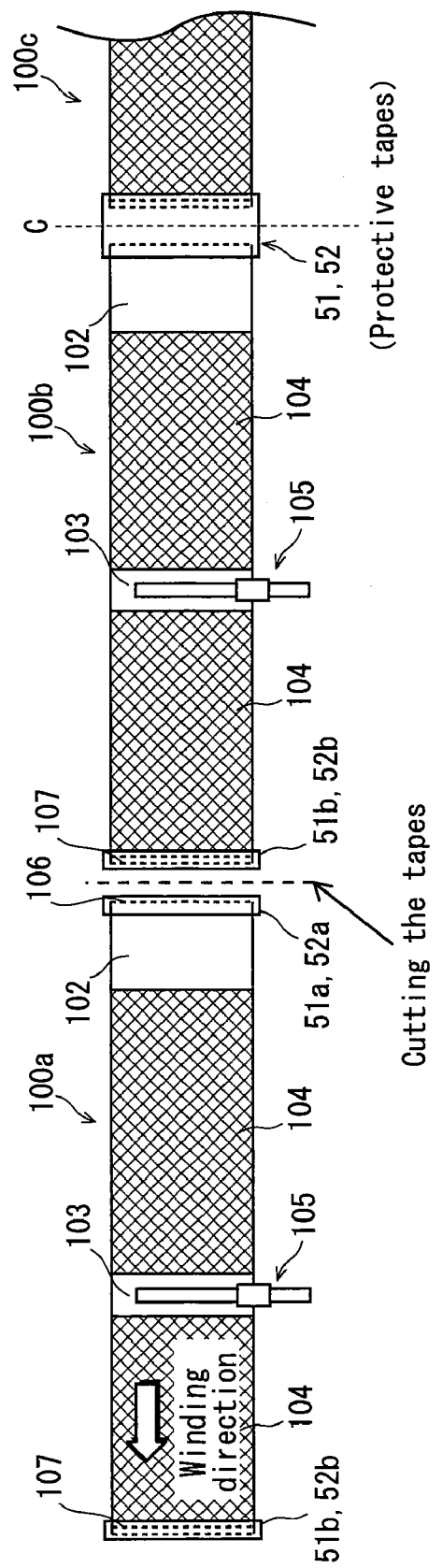

METHOD AND APPARATUS FOR MANUFACTURING WOUND ELECTRODE ASSEMBLY FOR BATTERY

BACKGROUND OF THE INVENTION (1) Field of the Invention

The present invention relates to a method for manufacturing electrode assemblies for batteries and an apparatus for manufacturing wound electrodes, and in particular to a method for manufacturing wound electrode assemblies by cutting and winding pieces of an electrode plate pulled out from an electrode plate roll.

(2) Description of the Related Art

As a method for manufacturing wound electrode assemblies for batteries, it is common to pull out an electrode plate bit by bit from an electrode plate roll, cut off one-cell-long pieces from the electrode plate with a cutter, and wind the electrode plate pieces.

Here, degradation of the cutter increases the occurrence of burrs at the cut edges, and increases burrs in size as well. Such burrs can be a cause of short circuit in a wound electrode assembly (Japanese Patent Application Publication No. 10-241737).

In view of this, a conventional method to control burrs is required to beforehand determine an acceptable level of burrs, regularly check the burrs by sampling, and change the cutter with a new one when the acceptable level is reached.

Also, as disclosed in Japanese Patent Application Publication No. 2001-85066, there is a well-known technique to prevent short circuit in an electrode assembly even if burrs occur at the cut edge. According to this method, protective tapes are bonded to the cut edges so as to sandwich them and cover the both sides of the electrode plate pieces.

SUMMARY OF THE INVENTION

However, since each one-cell-long electrode plate piece has two cut edges namely the downstream-side edge and the upstream-side edge, two processing steps are required to bond protective tapes to the downstream-side and upstream-side edges. This takes a considerable time. As the time required for these tape bonding steps increases, the takt time (i.e. the time interval between winding up of a one-cell-long piece and winding up of the next one-cell-long piece) of the winding process increases as well. This can be a cause of degradation of the productive efficiency.

Here, it is possible to bond protective tapes to a position to be cut, before cutting an electrode plate, and cut the protective tapes and the electrode plate together. This requires only a single step to bond the protective tapes per one-cell-long electrode plate piece, and reduces the time for bonding the tapes. However, if a burr that is larger than the thickness of the protective tapes occurs in the cutting of the electrode plate, the protective tapes can not cover the whole burr. In such cases, the protective tapes do not have a sufficient effect of preventing the occurrence of short circuit in the electrode assembly.

The present invention is made in view of the above problem. An object of the present invention is to provide a method for achieving a sufficient effect of preventing the occurrence of short circuit in an electrode assembly by bonding protective tapes to cut edges of an electrode plate, without taking a considerable time for the bonding the protective tapes.

To fulfill this object, the present invention provides a method for manufacturing a wound electrode assembly, comprising: an electrode plate cutting step of cutting off an electrode plate piece having a length of one cell from a strip of electrode plate; a gap forming step of forming a gap between cut edges of the electrode plate piece and the electrode plate; a tape bonding step of bonding protective tapes to both sides of the electrode plate piece and the electrode plate to cover the gap and the cut edges; a tape cutting step of cutting the protective tapes at a position within the gap; and a winding step of winding the electrode plate piece having the cut protective tapes bonded thereto. Here, the "protective tape" means a tape for covering the surface of the electrode plate.

With the stated method for manufacturing a wound electrode assembly pertaining to the present invention, a strip of electrode plate is cut in the electrode plate cutting step, into electrode plate pieces each having a length of one cell.

Then, in the gap forming step and the tape bonding step, the cut edges of each electrode plate piece are covered with protective tapes, which are bonded to both sides of the electrode plate piece, and thus adjacent electrode plate pieces are connected together by protective tapes. Also, as protective tapes are bonded to the cut edges after the cutting of the electrode plate, the cut edges are covered with protective tapes in a favorable manner.

After that, the protective tapes are cut in the tape cutting step, at a position within the gap between the adjacent electrode plate pieces, and the electrode plate pieces are separated. Even after the separation, the cut edges are covered with the protective tapes bonded to both sides of the electrode plate pieces. Each of the electrode plate pieces with the protective tapes is wound up in the winding step, and thus a wound electrode assembly is manufactured. In an electrode assembly thus manufactured, the edges of the electrode plate piece are covered with the protective tapes which sandwich the edges. The tapes therefore have an effect of preventing the occurrence of short circuit in an electrode assembly even if burrs that are larger than the thickness of the protective tapes have occurred at the cut edges.

Also, according to the stated method for manufacturing a wound electrode assembly, protective tapes are bonded in the tape bonding step to both sides of the electrode plate piece and the electrode plate, to cover the gap and the cut edges. Thus, protective tapes are bonded to both cut edges by a single operation. That is, only a single operation is required to bond protective tapes to a one-cell-long electrode plate piece, which reduces the time for bonding the tapes.

As a result, the method pertaining to the present invention prevents the increase in takt time in the winding process which might be caused due to the time required for the bonding of the protective tapes.

Another aspect of the present invention is a wound electrode assembly manufacturing apparatus for manufacturing a wound electrode assembly by pulling out a strip of electrode plate bit by bit, cutting off an electrode plate piece having a length of one cell from the electrode plate, and winding the electrode plate piece, the apparatus comprising: an electrode plate cutter operable to cut off the electrode plate piece; a gap forming unit operable to form a gap between cut edges of the electrode plate piece and the electrode plate; a tape bonding unit operable to bond protective tapes to both sides of the electrode plate piece and the electrode plate to cover the gap and the cut edges; a tape cutter operable to cut the protective tapes at a position within the gap; and a winding unit operable to wind the electrode plate piece having the cut protective tapes bonded thereto. This apparatus for manufacturing wound electrode assembly achieves the same effect as the manufacturing method described above.

As explained above, the method and the apparatus pertaining to the present invention realize manufacturing of a wound electrode assembly that does not easily cause short circuit, without degrading the productive efficiency.

In the above-described method and apparatus for manufacturing the wound electrode assembly, the electrode plate may be pulled out bit by bit to a first stage in which the electrode plate cutting step, the gap forming step and the tape bonding step are performed, and the electrode plate piece with the protective tapes may be conveyed from the first stage to a second stage in which the tape cutting step is performed. With this structure, the processes can be performed in parallel in the first stage and the second stage.

This structure further reduces the total time required for the electrode plate cutting, the gap forming, the tape bonding and the tape cutting, and more efficiently prevents the increase in takt time in the winding process.

Moreover, the second stage immediately before the electrode plate winding process includes only the protective tape cutting, and it is unnecessary to perform the electrode plate cutting in this stage. This prevents powder dust and small fragments, generated in the electrode plate cutting, from being mixed into the electrode assembly in the electrode plate winding process.

The present invention realizes the manufacture of a wound electrode assembly that does not easily cause short circuit, without degrading the productive efficiency. Thus, the present invention is suitable for the manufacture of wound electrode assemblies for various kinds of batteries such as nonaqueous electrolyte batteries.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIGS. 3A to 3D illustrate an electrode plate cutting & tape bonding process;

FIGS. 6A and 6B illustrate a process for cutting protective tapes;

FIG. 7 shows that protective tapes are cut and an electrode plate piece 100a and an electrode plate piece 100b are separated from each other;

DESCRIPTION OF THE PREFERRED EMBODIMENT

Figure 1:
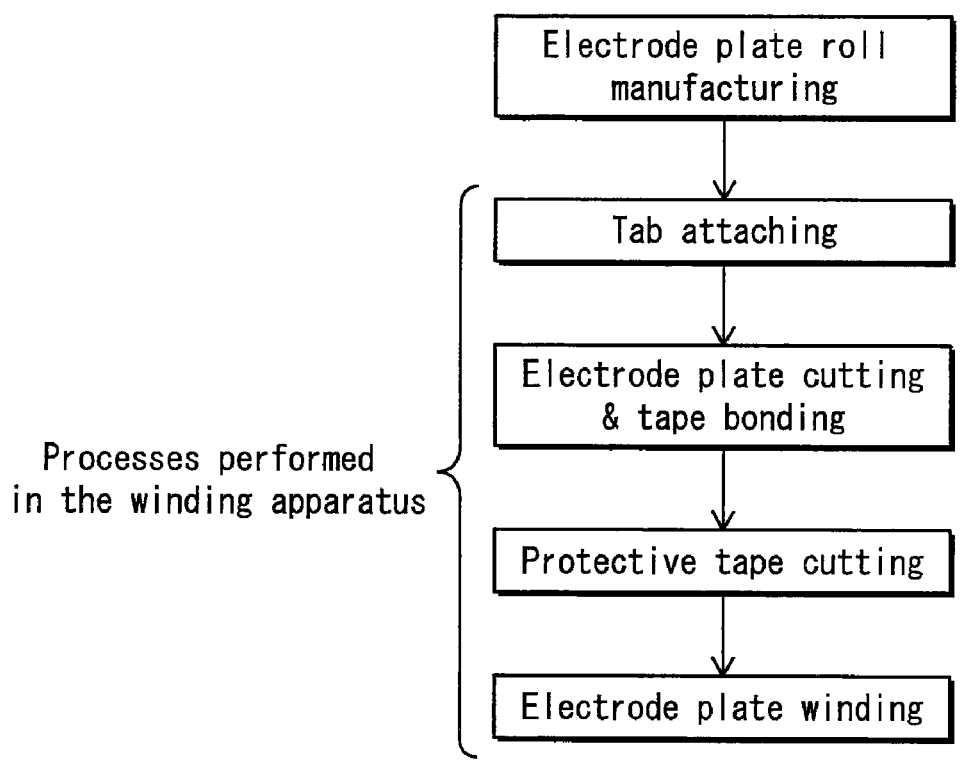
FIG. 1 is a process chart showing manufacturing processes for an electrode assembly pertaining to an embodiment.

FIG. 1 is a process chart showing manufacturing processes for an electrode assembly pertaining to an embodiment of the present invention.

As FIG. 1 shows, the manufacturing processes for an electrode assembly include an electrode plate roll manufacturing process, a tab attaching process, an electrode plate cutting & tape bonding process, a protective tape cutting process, and an electrode plate winding process.

An electrode plate roll manufactured through the electrode plate roll manufacturing process is set up in an electrode assembly winding apparatus.

The electrode assembly winding apparatus includes a stage for the tab attaching process, a stage for the electrode plate cutting & tape bonding process, a stage for the protective tape cutting process, and a stage for the electrode plate winding process.

The electrode plate pulled out from the electrode plate roll passes through the stages (i.e. stations) in the electrode assembly winding apparatus one by one, and each of the processes are performed in the corresponding stage. Specifically, while a portion of the electrode plate pulled out beforehand in the electrode assembly winding apparatus is going through the electrode plate winding process, the subsequent portion of the electrode plate piece goes through the protective tape cutting process, and another portion of the electrode plate, following the subsequent electrode plate, goes through the electrode plate cutting & tape bonding process and the tab attaching process, respectively in the corresponding stages.

The following explains each of the processes, based on an example case of manufacturing an electrode assembly for a nonaqueous electrolyte battery and bonding protective tapes to the positive electrode plate of the electrode assembly.

1. Electrode Plate Roll Manufacturing Process

A positive-mixture slurry is firstly manufactured by mixing lithium cobalt oxide as a positive-electrode active material, a carbon powder as an electrical conducting material, polyvinylidene fluoride as a binding agent, and N-methylpyrrolidone.

The slurry is applied on both sides of an aluminum foil (having the thickness of 15 μm, for example) pulled out from an aluminum foil roll. Here, the slurry is not applied on cutting areas 102 near cutting lines A, and tab areas 103 to each of which a collector tab is to be attached (See FIG. 2).

The applied slurry is dried with a dryer and pressed with a roller, and thus a positive-mixture layer 104 is formed. These steps produce a positive electrode plate, which is an aluminum foil as a core material, having the positive-mixture layer 104 formed thereon.

The electrode plate thus manufactured is cut with a slitter into strips each having a predetermined width. Also, each of the strips is wound up to be in the form of a roll. Thus, an electrode roll in the roll shape is manufactured.

2. Tab Attaching Process

The electrode roll is set up in the electrode assembly winding apparatus, and a tab 105 is welded to each of the tab areas 103 of the electrode plate pulled out from the electrode roll.

Figure 2:
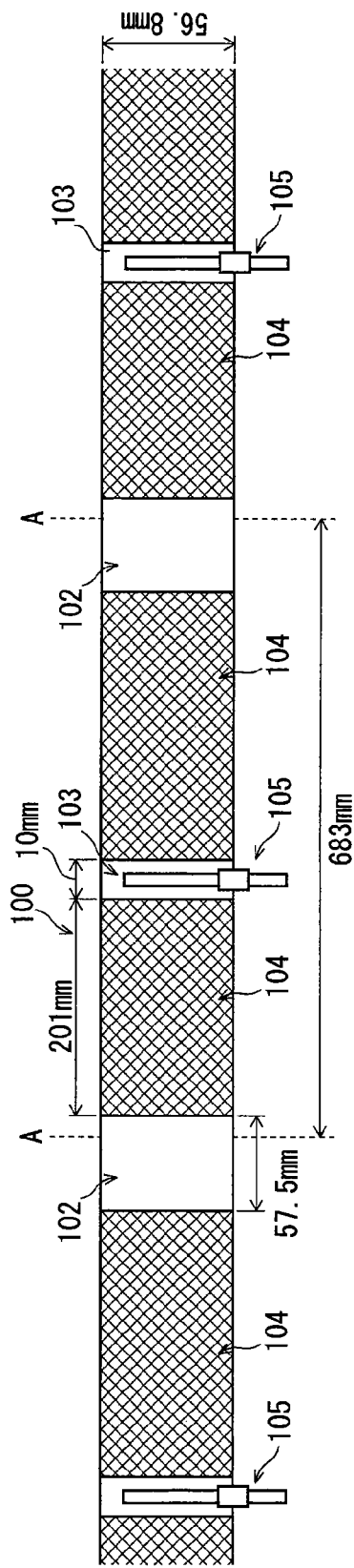
FIG. 2 shows the structure of an electrode plate 100 with tabs.

FIG. 2 shows an electrode plate 100 pulled out from the electrode roll, to which tabs 105 have been attached.

The electrode plate 100 is conveyed to the subsequent stage for the electrode plate cutting & tape bonding process.

3. Electrode Plate Cutting & Tape Bonding Process

FIGS. 3A to 3D illustrate the electrode plate cutting & tape bonding process. As shown in this drawing, the electrode plate cutting & tape bonding process includes the steps of electrode plate cutting (FIG. 3A), pitch widening (FIG. 3B), tape bonding (FIG. 3C) and electrode plate conveying (FIG. 3D), which are to be performed in the stated order.

For performing these steps, a pair of rollers 10a & 10b and a roller 11, which are for conveying the electrode plate 100, are provided downstream (i.e. the left side on FIGS. 3A to 3D) and upstream (i.e. the right side on FIGS. 3A to 3D), respectively.

The electrode assembly winding apparatus is also provided with a pair of cutters 20a & 20b for cutting the electrode plate 100, two pairs of chucks 21a & 21b and 22a & 22b for grasping the electrode plate 100, and a pair of tape bonding jigs 23 & 24 for bonding protective tapes to the electrode plate 100.

The cutters 20a & 20b are arranged at a cutting position B between the roller 11 and the rollers 10a & 10b. The positions of the tape bonding jigs 23 & 24 are also adjusted according to the cutting position B.

The chucks 21a & 21b and 22a & 22b are provided downstream and upstream from the cutting position B, respectively. Note that the chucks 22a & 22b are configured to be able to move upstream while grasping the electrode plate 100.

The tape bonding jigs 23 & 24 are jigs each for sucking protective tapes one by one and bonding each tape to the surface of the electrode plate by pressing it against the plate. Specifically, a vacuum suction pad may be used for this purpose.

The following explains the steps one by one.

(1) Electrode Plate Cutting (FIG. 3A)

The electrode plate 100 is conveyed by operation of the rollers 10a & 10b, and is stopped when a cutting line A reaches the cutting position B.

Then, the electrode plate is grasped with the chucks 21a & 21b and the chucks 22a and 22b, and is cut off with the cutters 20a & 20b. Thus the electrode plate 100 is cut along the cutting line A into a preceding electrode plate piece 100a and a succeeding electrode plate piece 100b. The electrode plate piece 100a has the length required for manufacturing a single cell.

Figure 4:
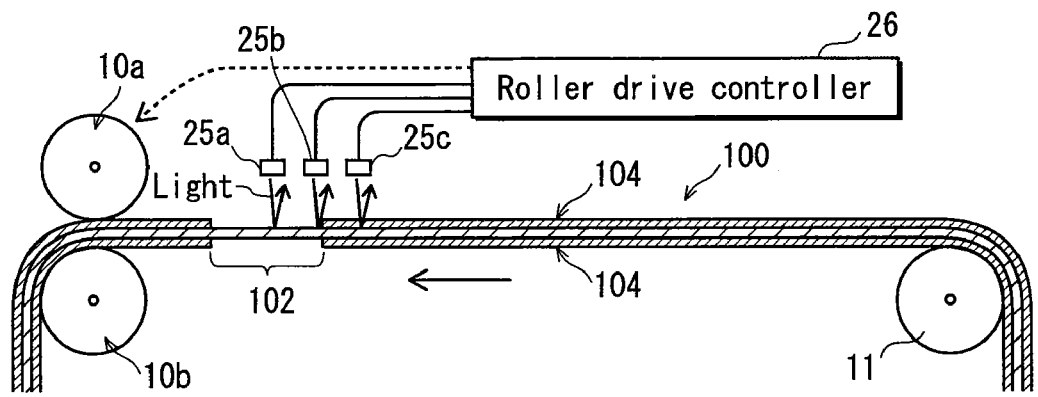
FIG. 4 illustrates a control mechanism for stopping cutting line A at a cutting position B.

FIG. 4 illustrates a control mechanism for stopping the cutting line A at the cutting position B.

A plurality of reflectance sensors 25a to 25c are arranged near the cutting position B along the conveyance direction. Each of the reflectance sensors 25a to 25c irradiates the part of the electrode plate 100 that passes immediately below the sensor with light, and receives the reflected light to sequentially obtain the reflectances. The reflectances are input to a roller drive controller 26.

The reflectance of the surface of the electrode plate 100 is large on the cutting area 102 to which the positive mixture is not applied, whereas it is small on the positive-mixture layer 104. That is, the reflectance to be measured by the reflectance sensors 25a to 25c greatly changes at the border (i.e. edge) between the cutting area 102 and the positive-mixture layer 104. Thus, the roller drive controller 26 is capable of predicting when the edge passes immediately below the reflectance sensors 25a to 25c, based on the reflectances sequentially received from the reflectance sensors 25a to 25c. The roller drive controller 26 predicts when the cutting line A reaches the cutting position B, and stops the rollers 10a & 10b according to the obtained timing. Here, note that the present embodiment is provided with the cutting areas 102 and the tab areas 103, to which the positive mixture is not applied. Alternatively, the cutting areas 102 may be configured to be longer than the tab areas 103, and the distance between the reflectance sensor 25a and the reflectance sensor 25c may be configured to be longer than the tab areas 103 (e.g. no less than 10 mm) so that the cutting areas 102 can be detected. Another method to stop the cutting lines A at the cutting position B is detecting the tabs 105 attached to the electrode plate 100.

(2) Pitch Widening (FIG. 3B)

The chucks 22a & 22b are moved upstream under the condition that the electrode plate pieces 100a and 100b are both grasped with the chucks 21a & 21b and the chucks 22a & 22b respectively, so that a gap W having a constant length is formed between the upstream-side edge 106 of the electrode plate piece 100a and the downstream-side edge 107 of the electrode plate piece 100b.

(3) Tape Bonding (FIG. 3C)

Then, protective tapes 51 and 52 are attached to the electrode plate pieces 100a and 100b with the tape bonding jigs 23 & 24 so as to cover the gap W kept between the upstream-side edge 106 and the downstream-side edge 107. Specifically, the protective tapes are attached such that the electrode plate pieces 100a and 100b are sandwiched between the protective tapes 51 and 52, and the upstream-side edge 106, the downstream-side edge 107 and the gap W therebetween are covered with the protective tapes 51 and 52.

Here, it is preferable that the protective tapes 51 and 52 are adhesive insulating tapes. Usable base material of the tapes is, for example, resin of polyolefin such as polyethylene and polypropylene, polyester, polyimide, polyamide, polyphenylene sulfide, or the like. Glass cloth tapes are also usable. A preferable thickness of the base material of the protective tapes 51 and 52 is 10 to 100 μm.

Figure 5A:
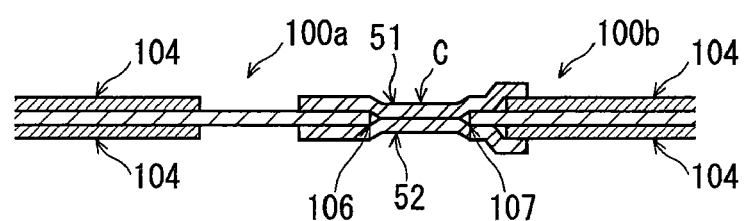
FIGS. 5A and 5B each show a cross section of a part of an electrode plate piece to which protective tapes are bonded.

As FIG. 5A shows, the upstream-side edge 106 of the preceding electrode plate piece 100a and the downstream-side edge 107 of the succeeding electrode plate piece 100b are connected by the bonded protective tapes 51 and 52, and the upstream-side edge 106 and the downstream-side edge 107 are covered with the protective tapes 51 and 52.

Even if large burrs occur at the edges 106 and 107 in the electrode plate cutting process described above, the burrs are pressed with the tape bonding jigs 23 & 24 and are reduced in size in this tape bonding process.

(4) Electrode Plate Conveying (FIG. 3D)

The chucks 21a & 21b and the chucks 22a & 22b are released and the rollers 10a & 10b are driven, so that the connected electrode plate pieces 100a and 100b are conveyed to the next stage for the protective tape cutting process.

4. Protective Tape Cutting Process

FIGS. 6A and 6B illustrate the process for cutting the protective tapes.

The protective tape cutting process includes the steps of protective tape cutting (FIG. 6A) and electrode plate conveying (FIG. 6B), which are to be performed in the stated order.

In the stage for the protective tape cutting process, two pairs of rollers 60a & 60b and 61a & 61b for conveying the electrode plate 100 are provided downstream and upstream respectively, in the similar manner as in the stage for the electrode plate cutting & tape bonding process described above. The stage is also provided with a pair of cutters 70a & 70b for cutting the protective tapes and two pairs of chucks 71a & 71b and 72a & 72b for grasping the protective tapes.

The cutters 70a & 70b are provided at the cutting position D between the pair of rollers 60a & 60b and the pair of rollers 61a & 61b. The pair of chucks 71a & 71b and the pair of 72a & 72b are provided downstream and upstream from the cutting position D, respectively.

(1) Protective Tape Cutting (FIG. 6A)

The rollers 60a & 60b are driven so as to convey the connected electrode plate pieces 100a and 100b. The electrode plate pieces 100a and 100b are stopped when the cutting line C (See FIG. 5A and FIG. 7) of the protective tapes 51 and 52 reach the cutting position D. The mechanism for stopping the cutting line C at the cutting position D is the same as explained above for the electrode plate cutting process. The cutting line C positioned within the gap between the upstream-side edge 106 and the downstream-side edge 107 (e.g. in the middle of the gap), namely in an area where only the protective tapes 51 and 52 exist and the electrode plate does not.

Then, the protective tapes 51 and 52 are grasped with the chucks 71a & 71b and the chucks 72a and 72b, and are cut off with the cutters 70a & 70b.

Figure 5B:
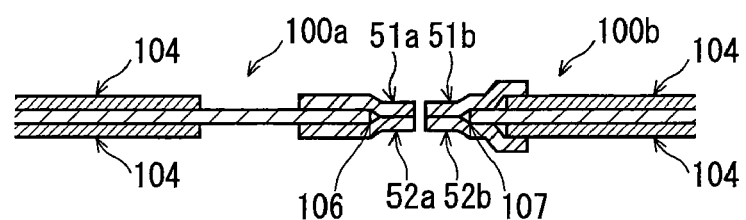

As FIG. 5B shows, the protective tapes 51 and 52 are cut along the cutting line C and divided into protective tape pieces 51a and 52a and protective tape pieces 51b and 52b, respectively. The electrode plate pieces 100a and 100b are separated, but the upstream-side edge 106 of the electrode plate piece 100a and the downstream-side edge 107 of the electrode plate piece 100b are kept covered with the protective tape pieces 51a and 52a and the protective tape pieces 51b and 52b, respectively.

FIG. 7 shows that the protective tapes are cut and the electrode plate pieces 100a and 100b that have been connected are separated from each other. The electrode plate piece 100b and the electrode plate piece 100c following it are connected by the protective tapes 51 and 52.

(2) Electrode Plate Conveying (FIG. 6B)

The chucks 71a & 71b and the chucks 72a & 72b are released and the rollers 60a & 60b are driven, so that the electrode plate piece 100a that has been separated is conveyed to the next stage for the electrode plate winding process.

5. Electrode Plate Winding Process

Figure 8:
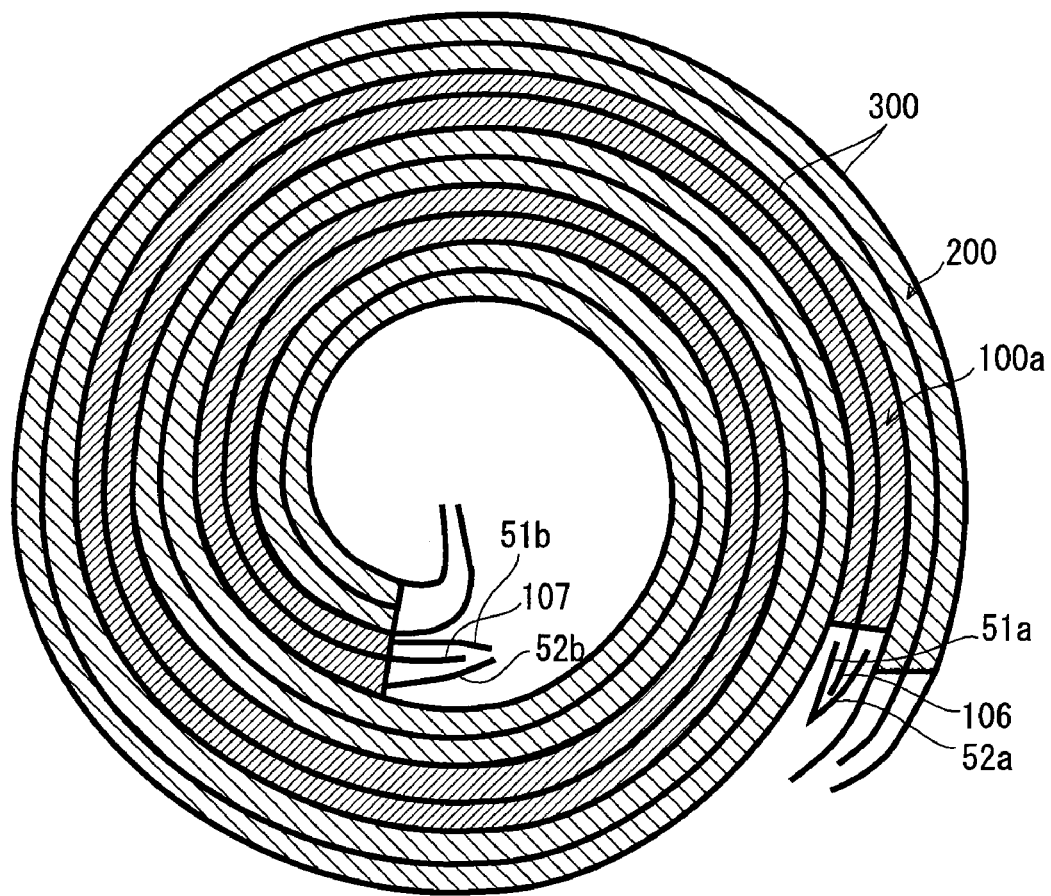
FIG. 8 shows a wound electrode assembly manufactured by an electrode plate winding process.

This stage is for manufacturing a wound electrode assembly as shown in FIG. 8 by winding, from the downstream-side edge 107, the electrode plate 100a conveyed from the previous stage, to which the pairs of protective tape pieces 51a & 52a and 51b & 52b had been bonded, together with an negative electrode plate 200 manufactured separately, such that a separator 300 is sandwiched therebetween.

The negative electrode plate 200 is manufactured in the following manner. A negative-mixture slurry is firstly manufactured by mixing graphite as a negative-electrode active material and carboxymethyl cellulose and styrene-butadiene rubber as a binding agent with water. Then, this slurry is applied to a copper foil (having the thickness of 8 μm, for example). The applied slurry is dried and thus a negative-mixture layer is formed. Finally, the foil is cut into pieces each having a predetermine size. As the separator, a microporous polyethylene film may be used, for example.

In the wound electrode assembly thus manufactured, the downstream-side edge 107 (i.e. the starting position of the winding) of the positive electrode plate piece 100a is kept covered with the protective tape pieces 51b and 52b, and the ending position of the winding (i.e. the upstream-side edge 106) is kept covered with the protective tape pieces 51a and 52a. Hence, even if burrs occur at the downstream-side edge 107 and the upstream-side edge 106, short circuit to the negative electrode plate 200 is prevented.

Advantageous Effects of the Manufacturing Method Pertaining to the Embodiment

According to the wound electrode assembly manufacturing method pertaining to the embodiment described above, the protective tapes are attached to the cut edges of the electrode plate after the electrode plate is cut into pieces. Thus, the cut edges are covered with protective tapes in a preferable manner. As a result, even if burrs occur at the cut edges, the protective tapes achieve a sufficient effect of preventing the occurrence of short circuit in the electrode assembly.

According to the wound electrode assembly manufacturing method pertaining to the embodiment described above, in the tape bonding process, the protective tapes 51 and 52 are integrally bonded to so as to cover the upstream-side edge 106 of the electrode plate piece 100a and the downstream-side edge 107 of the electrode plate piece 100b. Thus, only a single taping operation is required to bond the protective tapes 51 and 52 to both the upstream-side edge 106 and the downstream-side edge 107. In other words, only a single taping operation is required to manufacture the electrode plate piece for each single cell. Thus, the method pertaining to the embodiment does not require a long time for the bonding of the protective tapes.

Accordingly, the time required for the electrode plate cutting & tape bonding process and the protective tape cutting process is reduced, which prevents the increase in takt time in the winding process.

Moreover, according to the wound electrode assembly manufacturing method pertaining to the embodiment described above, the electrode plate cutting & tape bonding process and the protective tape cutting process are performed in different stages. Thus, the method allows the processes to be performed in parallel. This further reduces the time required for the electrode plate cutting & tape bonding process and the protective tape cutting process.

Furthermore, the stage immediately before the stage for the electrode plate winding process includes only cutting of the protective tapes is, and does not include cutting of the electrode plate. This prevents powder dust and small fragments, generated in the electrode plate cutting, from being mixed into the electrode assembly in the electrode plate winding process.

As described above, the wound electrode assembly manufacturing method pertaining to the embodiment reduces the time required for the electrode plate cutting & tape bonding process and the protective tape cutting process. Thus, it is easy to complete these processes in a shorter period than the winding of a one-cell-long electrode plate. This prevents an undesired increase in takt time of the winding process.

EXAMPLES

The following shows example sizes of electrode plates to be manufactured according to the embodiment above, protective tapes to be bonded to the electrode plates, and so on.

In FIG. 2, example sizes of the electrode plate 100 are depicted.

The width of the electrode plate 100 is 56.8 mm, and the length corresponding to one cell is 683 mm. The width of each cutting area 102 is 57.5 mm. The width of each tab area 103 is 10 mm. The length between the cutting area 102 and the tab area 103 is 201 mm.

Figure 9A:
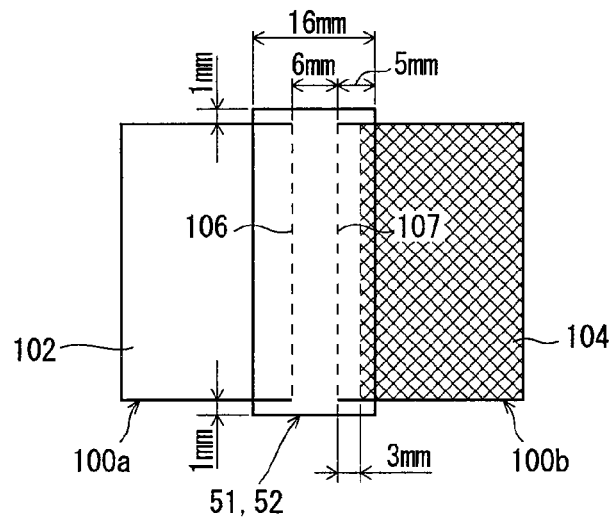
FIGS. 9A to 9C show example sizes of a part of an electrode plate piece to which protective tapes are bonded.
Figure 9B:
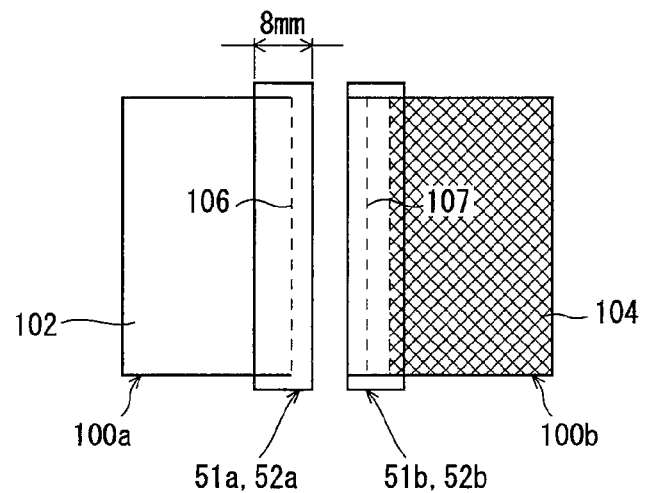
Figure 9C:
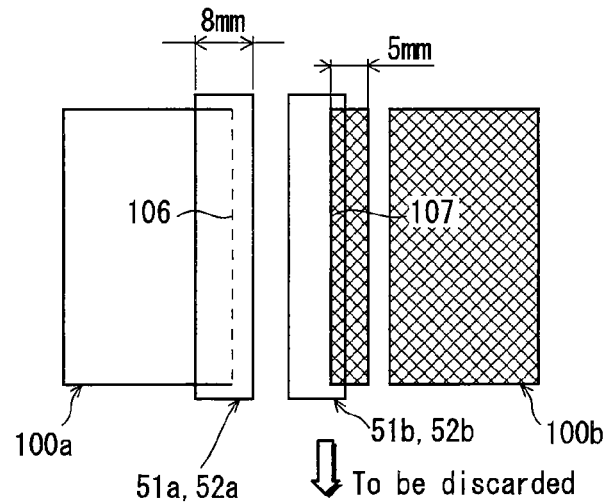

In FIGS. 9A to 9C, examples sizes of the part of the protective tapes 51 and 52 where is bonded to the electrode plate are depicted.

In the example depicted in FIG. 9A, the width of each of the protective tapes 51 and 52 is 16 mm. The length of the gap W between the upstream-side edge 106 and the downstream-side edge 107 is 6 mm. The margin for bonding of each electrode plate is 5 mm.

On the side of the upstream-side edge 106, the protective tapes 51 and 52 are bonded to the cutting area 102 to which the positive mixture is not applied. However, on the side of the downstream-side edge 107, the width of the cutting area 102 to which the positive mixture is not applied is only 3 mm, and thus the upstream edges of the protective tapes 51 and 52 are bonded to the positive-mixture layer 104.

Part of the protective tapes 51 and 52 lies off the electrode plate for 1 mm from each side of the electrode plate.

In the example depicted in FIG. 9B, the protective tapes 51 and 52 mentioned above are cut in the middle. The widths of the protective tape pieces 51a and 51b and the protective tape pieces 51b and 52b are each 8 mm.

FIG. 9C shows an example case of discarding the protective tape pieces 51b and 52b, and a part of the electrode plate piece 100b after completing the protective tape cutting process. The length of the part from the downstream-side edge 107 is 5 mm. In such a case, the electrode plate winding process is performed on the electrode plate 100a with a protective tape piece attached only to the downstream-side edge.

Modifications

According to the embodiment described above, the protective tapes are bonded only to the positive electrode plate. However, it is possible to bond the protective tapes to the negative electrode plate in a similar manner. The protective tapes may be bonded only to the negative electrode plate, or to both the positive electrode plate and the negative electrode plate.

According to the embodiment described above, the electrode plate winding process is performed on the electrode plate 100a without removing the protective tape pieces 51a and 52a bonded to the upstream-side edge 106 and the protective tape pieces 51b and 52b bonded to the downstream-side edge 107. However, in the cases where the protective tape at the starting part of the winding of the electrode plate piece 100a, the protective tape pieces 51ab and 52b and a downstream-side part (i.e. the vicinity of the downstream-side edge 107) may be cut off after the completion of the protective tape cutting process, and then the winding process may be performed (See FIG. 9C).

Although the embodiment above is explained based on an example case of manufacturing an electrode assembly for a nonaqueous electrolyte battery, the present invention has no limitation on battery type. The present invention is applicable to manufacturing of any type of wound electrode assembly.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A method for manufacturing a wound electrode assembly, comprising:
    an electrode plate cutting step of cutting off an electrode plate piece having a length of one cell from a strip of electrode plate; a gap forming step of forming a gap between cut edges of the electrode plate piece and the electrode plate;
    a tape bonding step of bonding protective tapes to both sides of the electrode plate piece and the electrode plate to cover the gap and the cut edges;
    a tape cutting step of cutting the bonded protective tapes at a position within the gap; and
    a winding step of winding the electrode plate piece having the cut protective tapes bonded thereto.

2. The method of claim 1, wherein the electrode plate is pulled out bit by bit to a first stage in which the electrode plate cutting step, the gap forming step and the tape bonding step are performed, and
    the electrode plate piece with the protective tapes is conveyed from the first stage to a second stage in which the tape cutting step is performed.

3. The method of claim 1, wherein
    in the gap forming step, the gap is formed by pulling the electrode plate piece and the electrode plate away from each other.

4. The method of claim 3, wherein
    the electrode plate is pulled out bit by bit to a first stage in which the electrode plate cutting step,
    the gap forming step and the tape bonding step are performed, and the electrode plate piece with the protective tapes is conveyed from the first stage to a second stage in which the tape cutting step is performed.

* * * * *